US011498682B2

(12) United States Patent
White et al.

(10) Patent No.: US 11,498,682 B2
(45) Date of Patent: Nov. 15, 2022

(54) ARRANGEMENT OF INDIVIDUAL SEATS FOR PASSENGERS OF AN AEROPLANE EQUIPPED WITH SCREEN SUPPORTS FORMING A SEPARATING WALL

(71) Applicant: Safran Seats, Plaisir (FR)

(72) Inventors: Jeremy White, Middlesex (GB); Nicholas Sandham, London (GB); Richard Seale, Warwickshire (GB); Omar Chraibi, London (GB)

(73) Assignee: Safran Seats, Plaisir (FR)

( * ) Notice: Subject to any disclaimer, the term of this patent is extended or adjusted under 35 U.S.C. 154(b) by 236 days.

(21) Appl. No.: 16/499,616

(22) PCT Filed: Mar. 29, 2018

(86) PCT No.: PCT/EP2018/058164
§ 371 (c)(1),
(2) Date: Sep. 30, 2019

(87) PCT Pub. No.: WO2018/178276
PCT Pub. Date: Oct. 4, 2018

(65) Prior Publication Data
US 2020/0216177 A1 Jul. 9, 2020

(30) Foreign Application Priority Data
Mar. 31, 2017 (FR) ........................................ 1752817

(51) Int. Cl.
*B64D 11/06* (2006.01)
(52) U.S. Cl.
CPC ...... *B64D 11/0606* (2014.12); *B64D 11/0601* (2014.12); *B64D 11/0605* (2014.12)

(58) Field of Classification Search
CPC .............. B64D 11/00153; B64D 11/06; B64D 11/0601; B64D 11/0602; B64D 11/0605; B64D 11/0606; B64D 11/0015
See application file for complete search history.

(56) References Cited

U.S. PATENT DOCUMENTS 7,178,871 B1 * 2/2007 Round ............... B64D 11/0606
297/244
7,852,622 B2 * 12/2010 Ferren .................... B60K 35/00
361/679.05
(Continued)

FOREIGN PATENT DOCUMENTS

DE 102008012523 9/2009
WO 2003013903 2/2003

OTHER PUBLICATIONS

International Patent Application No. PCT/EP2018/058164, English Translation of Written Opinion of the International Searching Authority, dated Jul. 31, 2019.
(Continued)

*Primary Examiner* — Richard R. Green
*Assistant Examiner* — Michael A. Fabula
(74) *Attorney, Agent, or Firm* — Kilpatrick Townsend & Stockton LLP (57) ABSTRACT

An arrangement of individual seats intended to be installed in an aeroplane cabin includes at least one module of two seats disposed opposite one another, said module having a longitudinal elongation direction, characterized in that said arrangement further comprises:
a console disposed between the two seats of the module;
a screen connected to each seat, each screen being mounted on a screen support;
the screen supports being movable between a stowed position and a deployed operating position, in which the screen supports are positioned substantially edge-
(Continued)

to-edge and form a partition wall between the two seats located opposite one another.

15 Claims, 7 Drawing Sheets

(56) References Cited

U.S. PATENT DOCUMENTS

| | | | |
|---|---|---|---|
| 9,266,614 B2* | 2/2016 | Henshaw | B64D 11/0605 |
| 9,469,405 B2* | 10/2016 | Henshaw | B64D 11/00155 |
| 10,124,895 B2* | 11/2018 | Simeon | B64D 11/0023 |
| 10,131,432 B2* | 11/2018 | Simeon | B64D 11/0601 |
| 10,329,018 B2* | 6/2019 | Herault | B64D 11/00153 |
| 10,358,220 B2* | 7/2019 | Carlioz | B64D 11/0639 |
| 2007/0246981 A1 | 10/2007 | Plant | |
| 2009/0302158 A1* | 12/2009 | Darbyshire | B64D 11/06 244/118.6 |
| 2012/0104165 A1 | 5/2012 | Dobrusin et al. | |
| 2013/0076082 A1* | 3/2013 | Herault | B64D 11/0638 297/173 |
| 2014/0035330 A1* | 2/2014 | Henshaw | B64D 11/0606 297/174 R |
| 2014/0361585 A1* | 12/2014 | Henshaw | B64D 11/0606 297/174 R |
| 2015/0136905 A1 | 5/2015 | Orson et al. | |
| 2016/0272323 A1* | 9/2016 | Carlioz | B64D 11/0602 |
| 2016/0297524 A1* | 10/2016 | Simeon | B64D 11/0606 |
| 2018/0105273 A1* | 4/2018 | Robinson | B64D 11/0605 |
| 2018/0281964 A1* | 10/2018 | Carlioz | B64D 11/0604 |
| 2019/0248497 A1* | 8/2019 | Ersan | B64D 11/0604 |
| 2019/0276151 A1* | 9/2019 | Dryburgh | B64D 11/0604 |
| 2019/0315468 A1* | 10/2019 | White | B64D 11/0641 |
| 2020/0148363 A1* | 5/2020 | White | B64D 11/0606 |

OTHER PUBLICATIONS

International Patent Application No. PCT/EP2018/058164, Search Report and Written Opinion, dated May 3, 2018.

* cited by examiner

ARRANGEMENT OF INDIVIDUAL SEATS FOR PASSENGERS OF AN AEROPLANE EQUIPPED WITH SCREEN SUPPORTS FORMING A SEPARATING WALL

The present invention relates to an arrangement of individual seats for passengers of an aeroplane provided with screen supports forming a partition wall.

"Business Class" type aeroplane seats offer passengers different comfort positions, from the "seated" position to a "reclined" position, in which the seat defines a substantially horizontal lying surface for the passenger.

Intermediate comfort positions are also proposed, such as the "relaxation" position, in which the backrest is greatly reclined. Generally, these positions are obtained by the incline of the backrest, pivoting about an axis horizontal and perpendicular to the axis of the seat. The passenger can then remain on the seat during transitions between different positions.

The bed is generally particularly formed by the backrest, the seat, a leg rest and a foot rest, which rests can be fixed to or connected to the kinematics of the seat.

Some "Business Class" type aeroplane cabin seating arrangements allow direct access to an aisle for all passengers via an aisle disposed between two seats that are arranged one behind the other in the longitudinal direction of the aeroplane. The passengers can thus easily leave their seat, particularly when the seat is in the "reclined" position, without disturbing other passengers.

In some configurations, the seats are disposed along two longitudinal columns and the seats of the same row have inclined axes, i.e. they form a non-zero angle relative to the longitudinal axis of the arrangement.

Document US 2007/246981 describes a chevron configuration, referred to as a "herringbone" configuration, in which the seats of the same row are turned inwardly toward the longitudinal axis of the arrangement, i.e. their axes intersect the longitudinal axis of the aeroplane at the front of the seats.

In the "reverse herringbone" type configuration described in document WO 03/013903, the seats of the same row are turned toward the outside of the longitudinal axis, i.e. the axes intersect the longitudinal axis of the aeroplane behind the seats. The passengers are thus oriented toward the aisle of the cabin.

The aim of the invention is to improve the modularity of the existing configurations by proposing an arrangement of individual seats intended to be installed in an aeroplane cabin comprising at least one module with two seats disposed opposite one another, said module having a direction of longitudinal elongation, characterized in that said arrangement further comprises:

- a console disposed between the two seats of the module;
- a screen connected to each seat, each screen being mounted on a screen support;
- the screen supports being movable between a stowed position and a deployed operating position, in which the screen supports are positioned edge-to-edge and form a partition wall between the two seats located opposite one another.

According to one embodiment, a length of a screen support is less than or equal to a width of the console when said screen support is in the stowed position.

According to one embodiment, at least one arm provides a connection between the screen support and a structural element.

According to one embodiment, one end of the arm is rotatably mounted relative to the support and another end of the arm is rotatably mounted relative to the structural element.

According to one embodiment, the structural element is a mast or a vertical side wall.

According to one embodiment, the arm is able to be received in a groove provided in a face of the screen support.

According to one embodiment, a slide mounted on the console is able to take-up forces applied on the arm of the screen support.

According to one embodiment, a screen is articulated relative to the corresponding screen support, in particular along a vertical axis of rotation.

According to one embodiment, a screen support comprises an outer flap and an inner flap articulated together along a vertical axis of rotation.

According to one embodiment, the outer flap is rotatably mounted about a vertical axis relative to a corresponding structural element.

According to one embodiment, one end of the inner flap is mounted to freely rotate and translate relative to a rail fixed on the console.

According to one embodiment, when a screen support is in the deployed operating position, the outer flap and the inner flap are substantially located in the same plane in the extension of one another.

According to one embodiment, when the screen supports are in the deployed operating position, the outer flaps of the two adjacent screen supports are located edge-to-edge so as to form a partition wall between the two seats.

According to one embodiment, a screen is mounted to freely rotate on one of the flaps.

According to one embodiment, when a screen support is in a stowed position, the outer flap and the inner flap are at least partially superposed on one another.

The present invention will be better understood and further features and advantages will become more clearly apparent upon reading the following detailed description, comprising embodiments that are provided for illustrative purposes with reference to the appended figures, which are provided by way of non-limiting examples, which can be used to fully understand the present invention and the disclosure of its implementation and, where appropriate, to contribute to its definition, and in which:

It should be noted that, in the figures, the structural and/or functional elements common to the various embodiments can have the same reference signs. Thus, unless otherwise stated, such elements have identical structural, dimensional and material properties.

It should be noted that the various technical features provided hereafter can be claimed independently from one another.

Figure 1A:
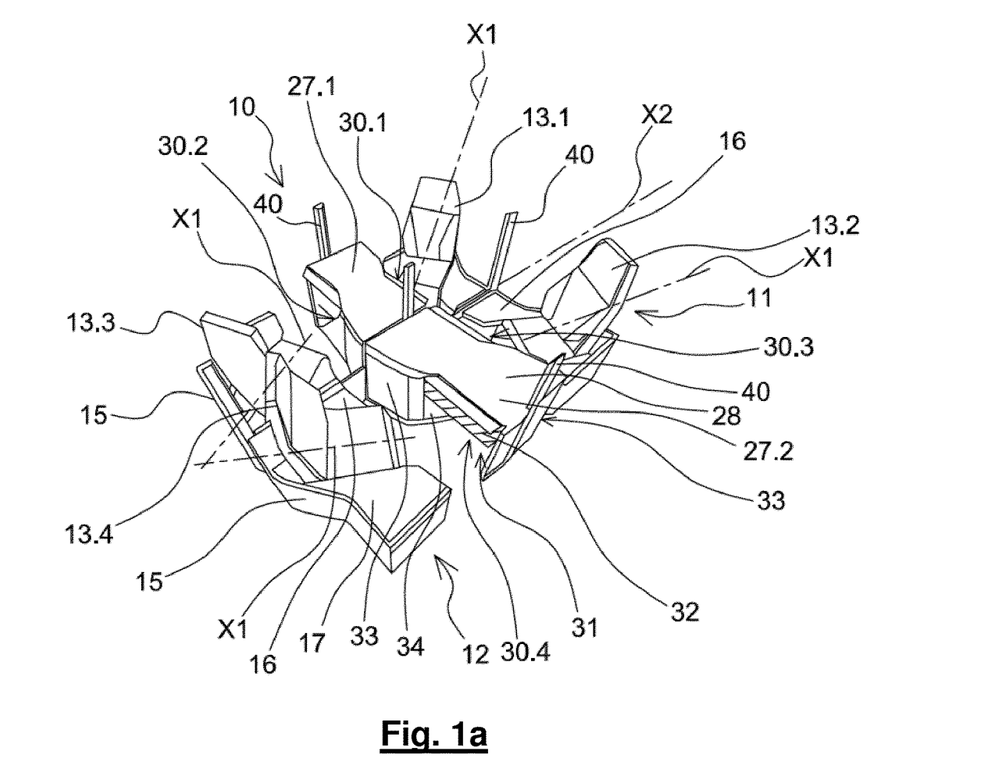
FIGS. 1a to 1c are perspective views illustrating a first embodiment of the arrangement of seats according to the invention without the screens.
Figure 1B:
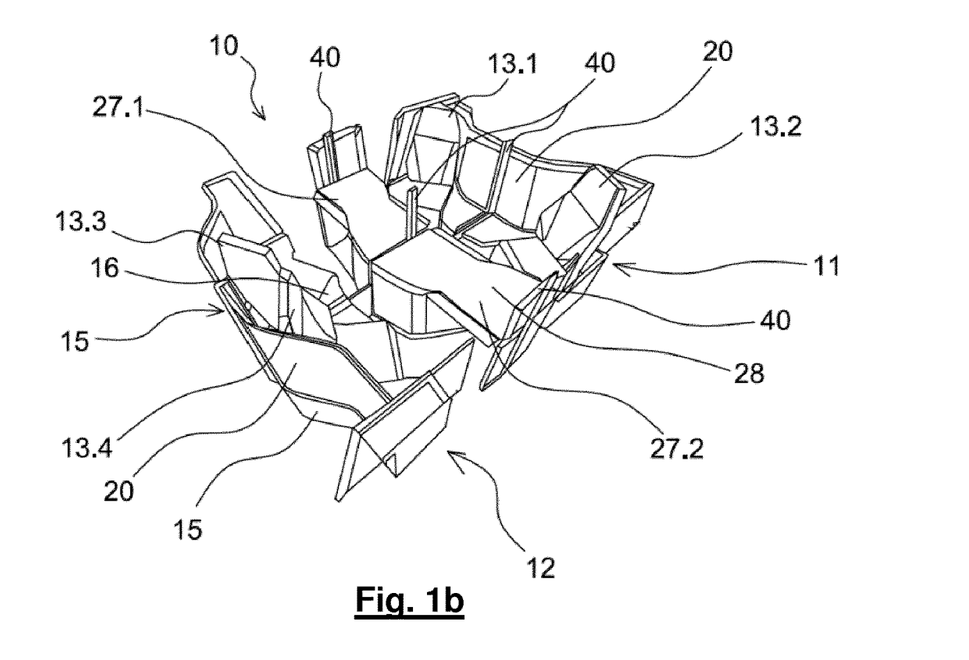
Figure 1C:
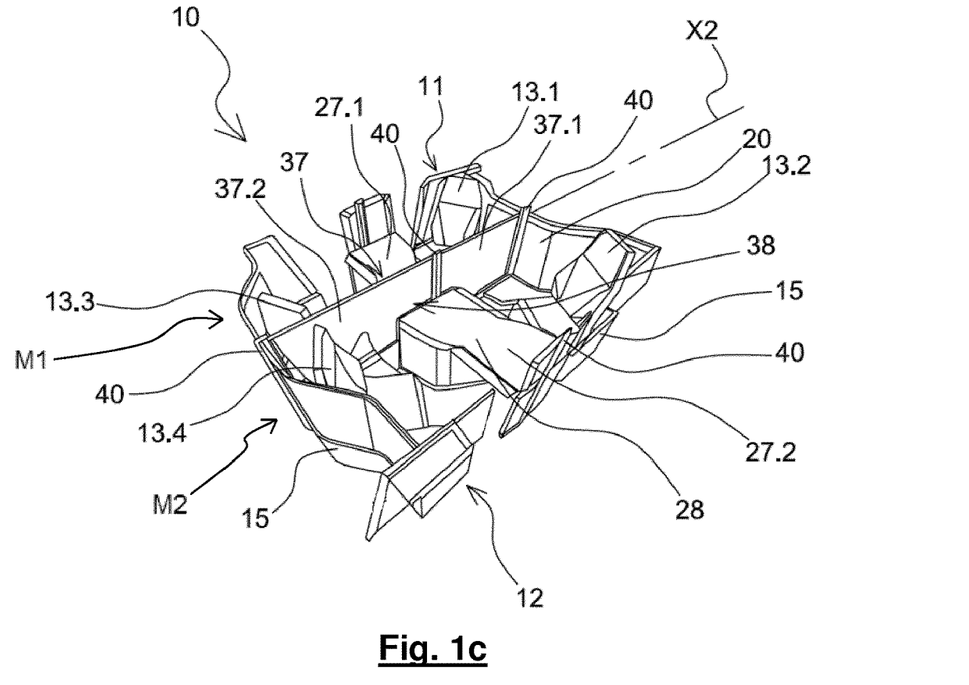

FIGS. 1a to 1c show an arrangement 10 of individual seats intended to be installed in an aeroplane cabin. This arrangement 10 comprises a first set 11 of two seats 13.1, 13.2 and a second set 12 of two seats 13.3, 13.4. In each set 11, 12, the seats (13.1 and 13.2 for the set 11, and 13.3 and 13.4 for the set 12) are located alongside one another.

Each seat 13.1-13.4 has an axis X1 corresponding to the intersection between a horizontal plane and a plane of symmetry of the seat. Each seat 13.1-13.4 preferably can be converted between a "seated" position corresponding to the position that is particularly used during the stopping, taking-off, and landing phases of the aeroplane, and a "reclined" position, in which the seat 13.1-13.4 defines a substantially horizontal lying surface for the passenger. Each seat 13.1-13.4 can also assume intermediate positions, called relaxation positions, between these two extreme positions.

The arrangement 10 has a longitudinal axis X2 that can extend along the axis of the aeroplane cabin or can be parallel to this axis. As a variant, the axis X2 can be substantially perpendicular or can form any angle relative to the axis of the cabin. The longitudinal axis X2 passes between the seats 13.1 and 13.2 (respectively 13.3 and 13.4) of the same set 11 (respectively 12). This axis X2 can be located in a plane of symmetry of the arrangement 10.

More specifically, a first seat 13.1 of the first set 11 is positioned opposite a first seat 13.3 of the second set 12 and a second seat 13.2 of the first set 11 is positioned opposite a second seat 13.4 of the second set 12.

In addition, the first seat 13.1 and the second seat 13.2 of the first set 11 are turned inwardly toward the longitudinal axis X2 of the arrangement 10. The first seat 13.3 and the second seat 13.4 of the second set 12 are turned outwardly away from the longitudinal axis X2 of the arrangement 10.

Preferably, the axes X1 of the seats 13.1, 13.2, 13.3, 13.4 form substantially the same angle relative to the longitudinal axis X2 of the arrangement 10. The axes X1 of the seats of the same set 11, 12 intersect the longitudinal axis X2 of the arrangement 10 substantially at the same point.

Thus, the axes X1 of the seats 13.1, 13.2 of the first set 11 intersect the longitudinal axis X2 at the front of the seats 13.1, 13.2 substantially at the same point; while the axes X1 of the seats 13.3, 13.4 of the second set 12 intersect the longitudinal axis X2 behind the seats 13.3, 13.4 substantially at the same point.

Alternatively, the axes X1 of the seats of the same set 11, 12 can be offset relative to each other along the longitudinal axis X2, so that the axes of the seats of the same set 11, 12 intersect the longitudinal axis X2 at different points.

Each seat 13.1, 13.2, 13.3, 13.4 is integrated into a corresponding housing of a base module 15. This base module 15 comprises an armrest 16 located on one side of the seat 13.1-13.4 and a cushion 17 located on the other side of the seat 13.1-13.4. The cushion 17 is preferably a sleep optimization cushion intended to be positioned in the extension of the lying surface of the seat 13.1-13.4 when said seat is in the reclined position. The armrest 16 can be a retractable armrest that can transition between a raised position allowing the passenger to rest their elbows when the corresponding seat 13.1-13.4 is in a seated position and a lowered position, in which the armrest 16 is located in the extension of the seat 13.1-13.4 in the reclined position.

Each seat 13.1-13.4 is also connected to a shell 20, particularly shown in FIG. 1b, positioned around its backrest to isolate the seat 13.1-13.4 from a neighboring arrangement 10. The shells 20 of the seats 13.1 and 13.2 (respectively 13.3 and 13.4) of the same set 11 (respectively 12) can be produced as a single piece.

Furthermore, the arrangement 10 comprises a first central console 27.1 and a second central console 27.2 positioned between the first set of seats 11 and the second set of seats 12. The central console 27.1 is disposed between the seats 13.1 and 13.3. The central console 27.2 is disposed between the seats 13.2 and 13.4. The central consoles 27.1, 27.2 each have a flat upper face 28, on which the passenger can particularly place objects.

The first central console 27.1 comprises a first foot area 30.1 and a second foot area 30.2 open in two opposite directions relative to each other and respectively associated with the first seat 13.1 of the first set 11 and the first seat 13.3 of the second set 12. Thus, the foot area 30.1 is located in the extension of the first seat 13.1 of the first set 11 when said seat is in the reclined position. The opposite foot area 30.2 is located in the extension of the first seat 13.3 of the second set 12 when said seat is in the reclined position.

Similarly, the second central console 27.2 comprises a first foot area 30.3 and a second foot rest area 30.4 open in two opposite directions relative to each other and respectively associated with the second seat 13.2 of the first set 11 and the second seat 13.4 of the second set 12. Thus, the foot area 30.3 is located in the extension of the second seat 13.2 of the first set 11 when said seat is in the reclined position. The opposite foot area 30.4 is located in the extension of the second seat 13.4 of the second set 12 when said seat is in the reclined position.

In each central console 27.1, 27.2, the foot areas 30.1 and 30.2 (respectively 30.3 and 30.4) are at least partially superposed along the longitudinal axis X2. Thus, there is at least one straight line perpendicular to the longitudinal axis X2 that intersects the two foot areas 30.1 and 30.2 (respectively 30.3 and 30.4) of the same central console 27.1 (respectively 27.2). More specifically, the foot areas 30.1-30.4 are formed by housings 31 open toward the corresponding seat 13.1-13.4 and a substantially horizontal foot rest cushion 32 located inside the housing 31 and on which the passenger can rest their feet, as shown in FIG. 1a.

The housings 31 produced in a central console 27.1, 27.2 are each delimited by a bottom 33, the bottoms 33 of the two housings 31 provided in the same consoles 27.1, 27.2 being interconnected by a common wall 34 that is inclined relative to the longitudinal axis X2.

In order to be modular, the central consoles 27.1, 27.2 are advantageously independent of one another. As a variant, the consoles 27.1, 27.2 nevertheless can be produced as one piece so as to form only a single part.

As illustrated in FIG. 1c, two modules M1, M2 of seats are defined, namely a first module formed by the seats 13.1 and 13.3 opposite one another, and a second module formed by the seats 13.2 and 13.4 opposite one another. These modules M1, M2 are separated by a central partition 37 extending along the longitudinal axis X2. The axes X1 of the seats 13.1 and 13.3 (respectively 13.2 and 13.4) are substantially parallel to each other. One of the seats 13.1 (or 13.2) is turned toward the axis X2 while the other seat 13.3 (or 13.4) is turned away from the axis X2. These modules M1 or M2 of two facing seats can be repeated in the side groups of seats in the aeroplane cabin. A longitudinal elongation direction D1 of a module M1, M2 is defined.

The central partition 37 is advantageously retractable between a deployed position and a stowed position. In the stowed position, said central partition 37 can be at least partially housed in a space 38 between the two central consoles 27.1, 27.2. The central partition 37 is produced in one or two parts 37.1, 37.2 to independently isolate the seats 13.1 and 13.2 (respectively 13.3 and 13.4) alongside the two sets of seats 11, 12.

In a particular embodiment, the central partition 37 is mechanically connected to masts 40. Indeed, the arrangement 10 comprises vertically extending hollow masts 40 for the passage of wiring harnesses particularly routing power and data signals for multimedia systems connected to the seats 13.1-13.4. It will thus be possible to take advantage of the presence of these masts 40 in order to use them as a support for fixing the central partition 37 and the other partitions of the arrangement 10. The presence of the central partition 37 nevertheless is not compulsory for defining these two modules M1, M2.

Figure 2A:
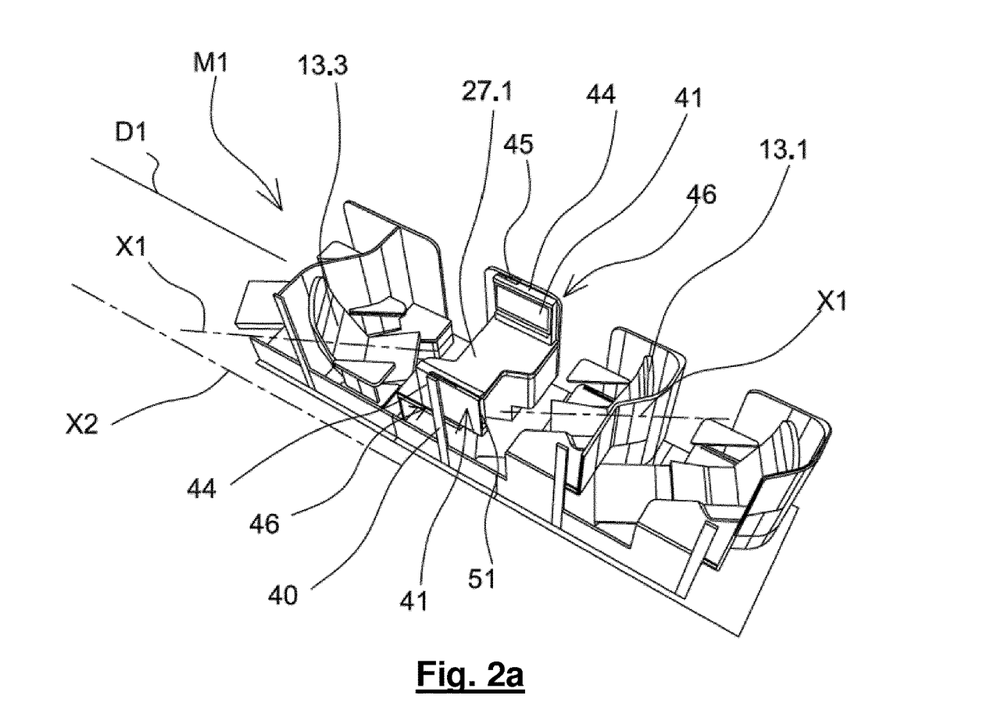
FIGS. 2a to 2c are perspective views illustrating the kinematics of screen supports according to the invention for forming a partition wall between two seats opposite one another.
Figure 2B:
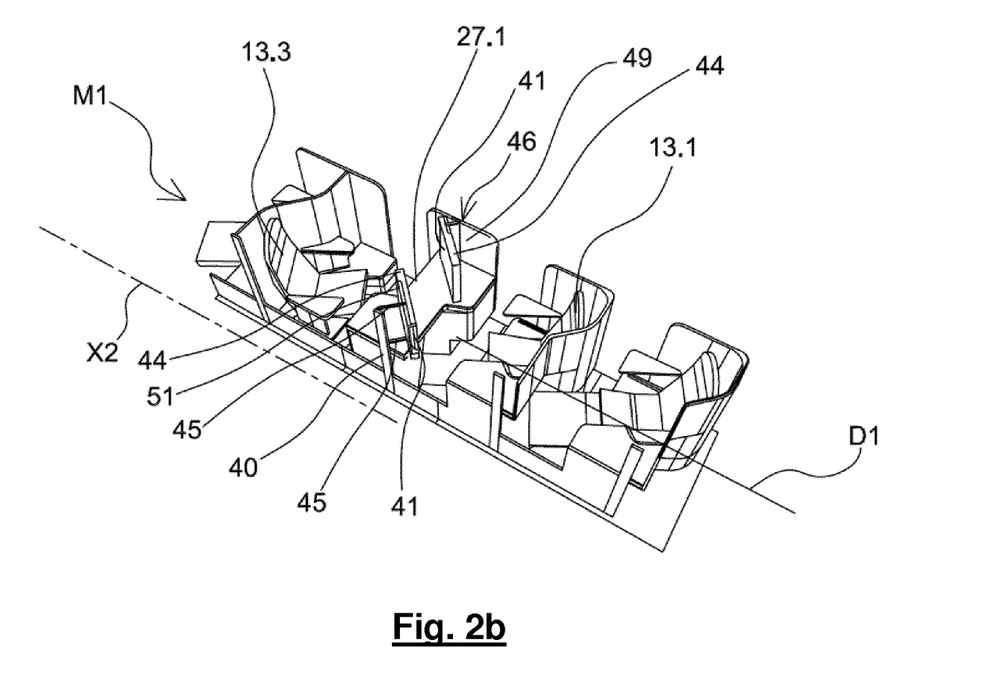
Figure 2C:
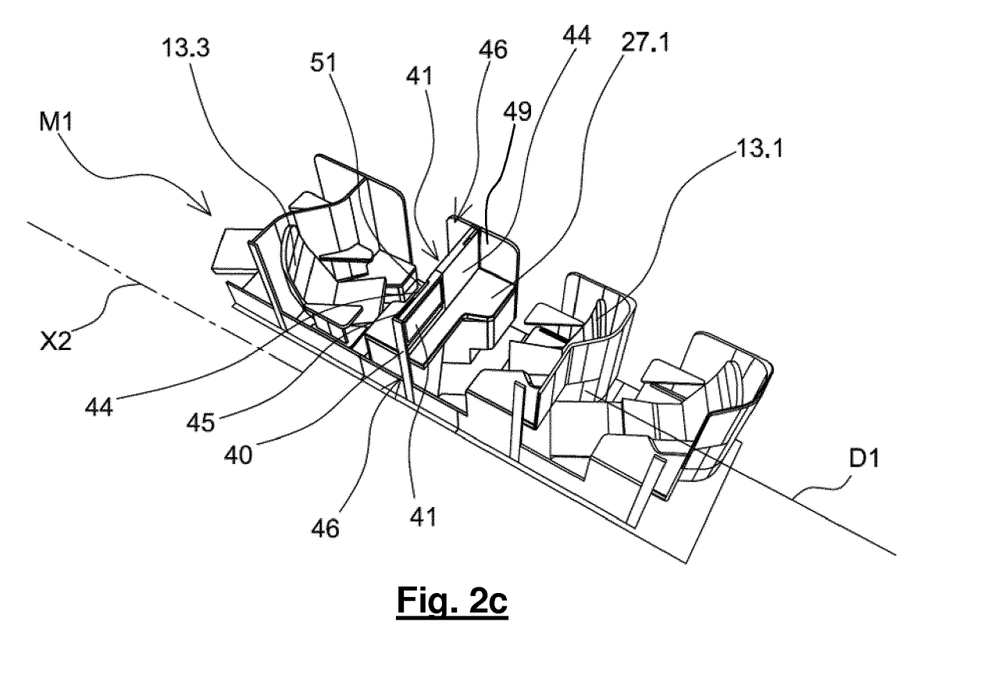

Moreover, as can be seen in FIGS. 2a to 2c, screens 41 are connected to each seat. Each screen 41 is mounted on a support 44. Arms 45 provide the connection between the support 44 and a structural element 46. One end of the arms 45 is rotatably mounted relative to the support 44 and the other end of the arms 45 is rotatably mounted relative to the structural element 46.

The screen supports 44 can move between a stowed position, in which the screen supports 44 extend substantially parallel to the direction D1, and a deployed operating position, in which the screen supports 44 extend substantially perpendicular to the direction D1.

The configuration is such that when the screen supports 44 are in a deployed operating position, the screen supports 44 are positioned substantially edge-to-edge and form a partition wall between the two seats 13.1 and 13.3 located opposite one another. This partition wall extends substantially perpendicular to the direction D1, i.e. it forms an angle of 90 degrees plus or minus 10 degrees relative to D1. "Substantially edge-to-edge" is understood to mean the fact that the side edges of the two screen supports 44 are in contact with each other by one of their edges or are at a short distance from one another. This distance is less than 10 cm and preferably is less than 5 cm.

Moreover, advantageously, in the stowed position, each screen support 44 extends along the width of the console 27.1 and does not exceed the console 27.1. In other words, the length of the screen support 44 is less than or equal to the width of the console 27.1 measured in the area occupied by the screen support 44 when said support is in the stowed position.

In this case, the structural element 46, to which the screen support 44 is connected via the arms 45, corresponds to a mast 40 for one of the screen supports 44. The structural element 46 corresponds to a vertical side wall 49 for the other screen support 44.

In the embodiment of FIGS. 2a to 2c, the arms 45 are received in grooves 51 respectively provided in an upper face and a lower face of the screen support 44. An edge of the groove 51 forms a stop for the screen support 44 in the deployed operating position.

Figure 3A:
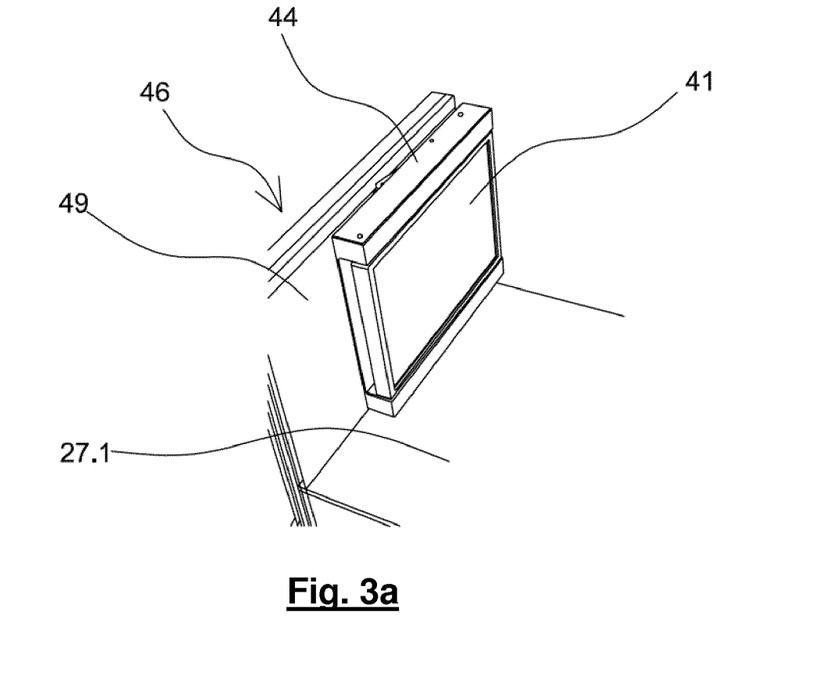
FIGS. 3a to 3c are perspective views illustrating the kinematics of a second embodiment of screen supports according to the invention.
Figure 3B:
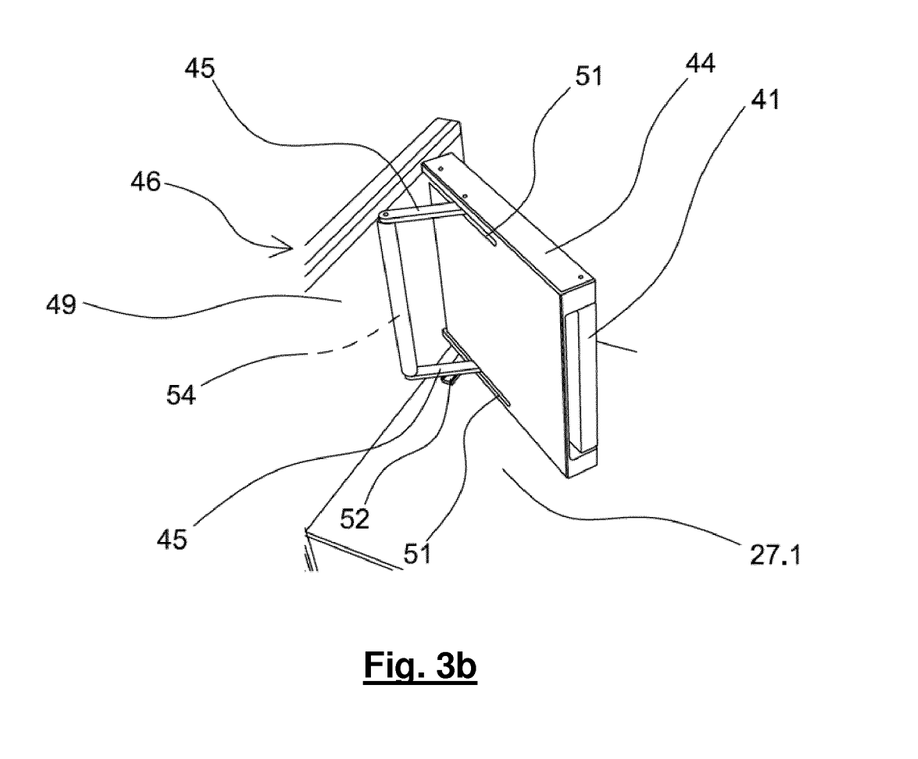
Figure 3C:
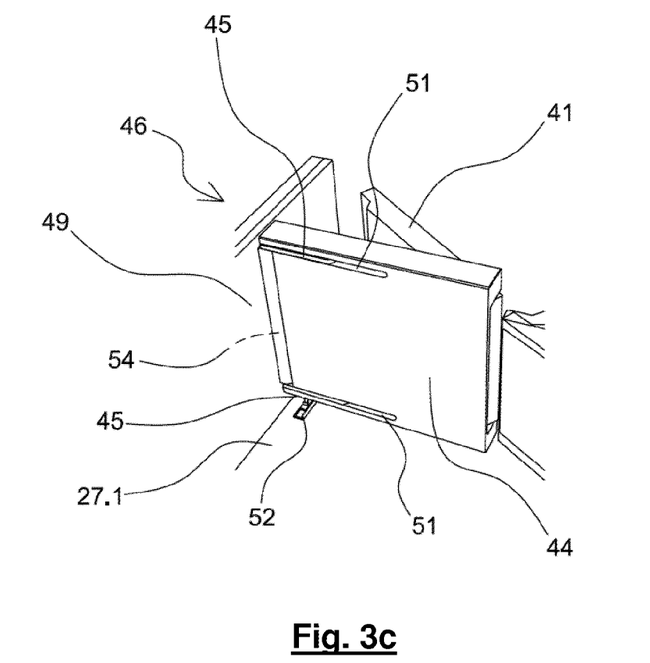
Figure 4A:
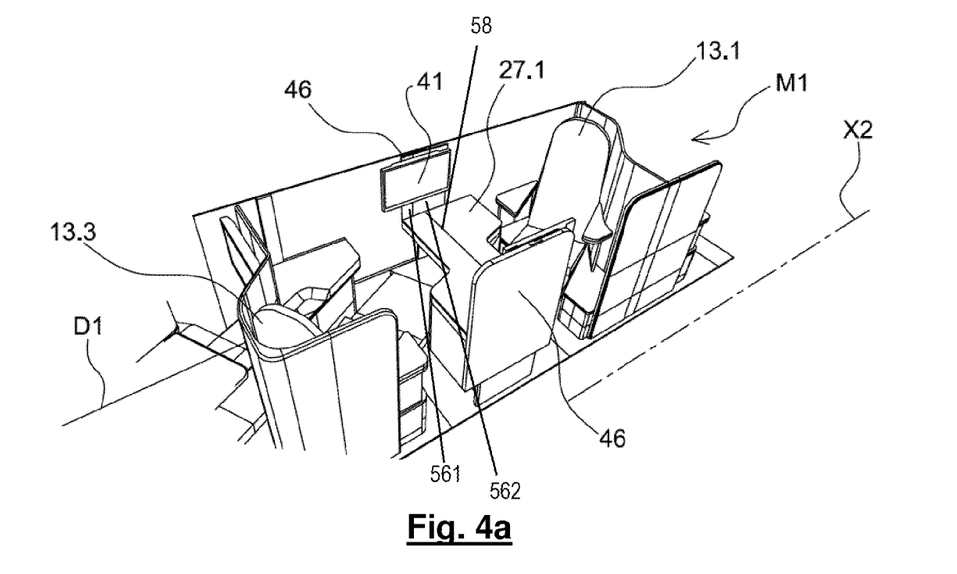
FIGS. 4a to 4d are perspective views illustrating the kinematics of a third embodiment of screen supports according to the invention.
Figure 4B:
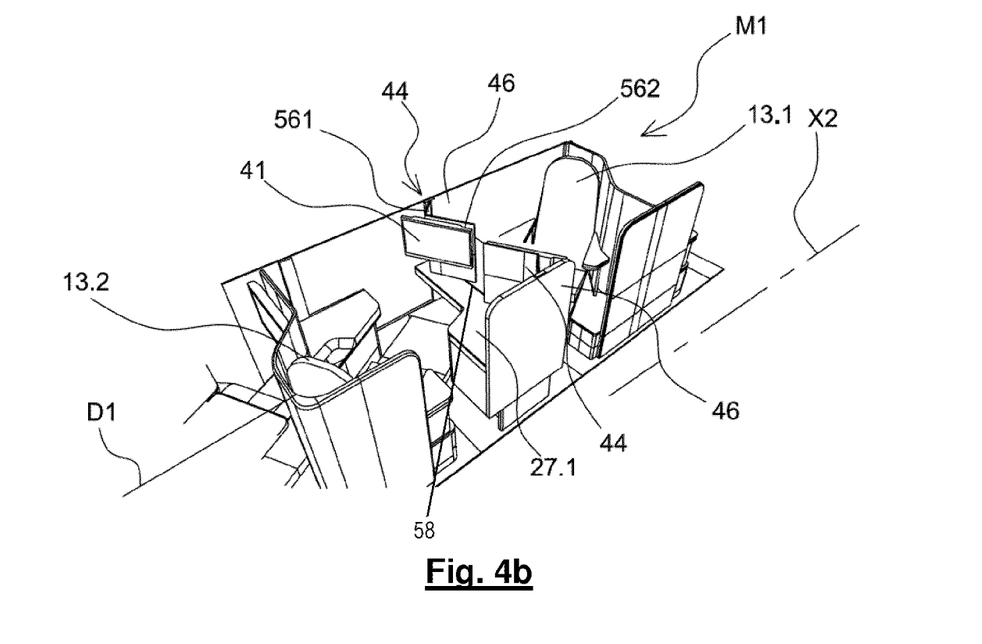
Figure 4C:
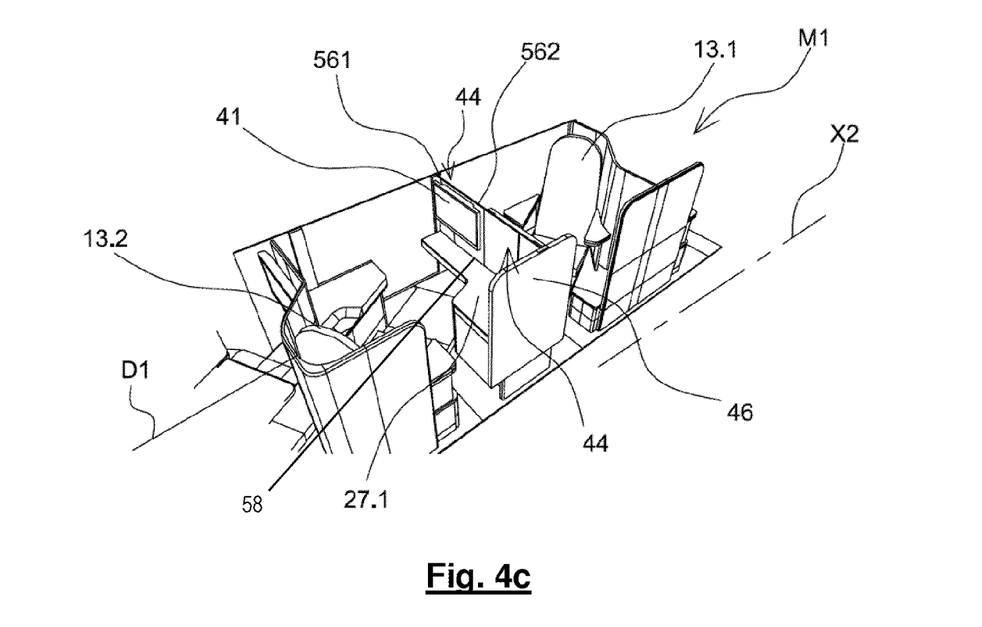
Figure 4D:
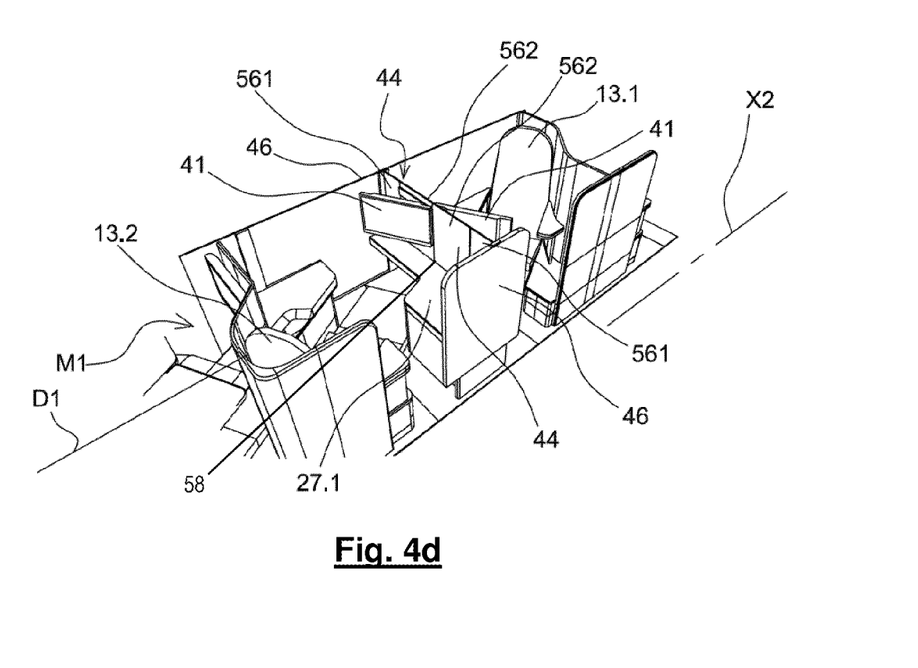

In the embodiment of FIGS. 3a to 3c, the arms 45 are received in elongated grooves 51 produced in the rear face of the screen support 44. The bottom of the groove 51 forms a stop for the screen support 44 in the deployed operating position.

In addition, a slide 52 can take-up the forces applied on the arms 45 of the screen support 44. The slide 52 supports the movement of the end of the support 44 closest to the structural element 46 when the screen support 44 transitions from one position to another. The slide 52 is mounted on the flat upper face 28 of the console 27.1 and the screen support 44.

Furthermore, the screen 41 also can be articulated relative to the support 44 along a vertical axis of rotation, as shown in FIG. 3c. This allows the passenger to orient the screen 41 in the desired direction. This axis of rotation is located near the end of the support 44 furthest from the structural element 46 when the screen support 44 is in the deployed operating position.

It also should be noted that the axis of rotation of the screen support 44 relative to the arms 45 is positioned at a distance from one end of the support 44 corresponding to the length of an arm 45. The distance is measured relative to the nearest end of the structural element 46 when the screen support 44 is in the deployed operating position.

The two arms 45 are interconnected by a substantially vertical connection portion 54 forming the axis of rotation of the arm 45 relative to the structural element 46. The arms 45 and the connection portion 54 thus form a U-shaped part positioned inside a guide fixed on the structural element 46.

As a variant, it will be possible to use a single arm 45 providing the mechanical connection between the screen support 44 and the structural element 46.

In the embodiment of FIGS. 4a to 4d, the screen support 44 comprises two flaps 561, 562 articulated together along a vertical axis of rotation. There is an outer flap 561, which is closest to the structural element 46 when the screen support 44 is in the deployed position, and an inner flap 562, which is furthest from the structural element 46 when the screen support 44 is in the deployed position. The outer flap 561 is rotatably mounted about a vertical axis relative to the corresponding structural element 46.

In order to transition from one position to another, one end of each inner flap 562 is able to slide along a transverse rail 58 that is perpendicular to the direction D1, while being able to rotate about a vertical axis. In other words, the end of the inner flap 562 is mounted to freely rotate and translate relative to the rail 58 fixed on the console 27.1.

When the screen support 44 is in the deployed operating position, the inner 561 and outer 562 flaps are substantially located in the same plane in the extension of one another.

In addition, when the screen supports 44 are in the deployed operating position, the outer flaps 562 of the two adjacent supports 44 are located substantially edge-to-edge so as to form a partition wall between the two seats 13.1 and 13.3 located opposite one another. This partition wall extends substantially perpendicular to the axis X2. "Substantially edge-to-edge" is understood to mean the fact that the outer flaps 562 of the two screen supports 44 are in contact with each other by one of their edges or are at a short distance from one another. This distance is less than 10 cm and preferably is less than 5 cm.

The screen 41 can be rotatably mounted on one of the flaps 561, 562 relative to a vertical axis. This allows the passenger to orient the screen 41 in the desired direction.

When the screen support 44 is in a stowed position, the flaps 561, 562 of the screen supports 44 can be at least partially superposed on one another.

As indicated, the axes X1 of the seats 13.1 and 13.3 form an angle relative to the axis X2. As a variant, the axes X1 of the seats 13.1, 13.3 nevertheless can be parallel relative to the axis X2.

According to one embodiment, the screen supports 44 can be formed by the casings of the screens 41.

As a variant, the arrangement comprises, along a column, only one succession of modules M1 or M2 as shown in FIG. 2a, for example, but not one succession of two modules side-by-side. In other words, it is not essential for the two modules M1 and M2 to be systematically connected with each other. These modules M1, M2 can be used independently in the seating arrangement of the aeroplane cabin.

The invention also can be implemented with seats installed in other means of transport, such as, for example, seats for buses, trains, or boats.

Of course, the various features, variations and/or embodiments of the present invention can be associated with each other according to various combinations to the extent that they are not incompatible or mutually exclusive.

Clearly, the invention is not limited to the embodiments described above that are provided solely by way of an example. It encompasses various modifications, alternative forms and other variants that can be contemplated by a person skilled in the art within the context of the present invention, and in particular any combinations of the various operating modes described above, which can be taken separately or in combination.

The invention claimed is:

1. An arrangement of individual seats for an aeroplane cabin, the arrangement comprising:
    a module of two seats facing each other, said module having a longitudinal direction;
    a console arranged between the two seats of the module; and
    a screen associated with each seat of the module, each screen being mounted on a corresponding screen support;
    wherein the screen supports are movable between a stowed position and a deployed operating position, wherein, in the deployed operating position, the screen supports are positioned substantially edge-to-edge and form a partition wall between the two seats facing each other, and wherein, in the stowed position, the screen supports extend substantially parallel to the longitudinal direction.

2. The arrangement according to claim 1, characterized in that a length of at least one screen support of the screen supports is less than or equal to a width of the console in a direction perpendicular to the longitudinal direction when said screen support is in the stowed position.

3. The arrangement according to claim 1, further comprising at least one arm connected to at least one screen support of the screen supports and configured to further connect to a structure.

4. The arrangement according to claim 3, characterized in that one end of the at least one arm is rotatably mounted relative to the at least one screen support of the screen supports and another end of the at least one arm is configured to rotatably mount to the structure.

5. The arrangement according to claim 3, further comprising the structure, wherein the structure is a mast or a vertical side wall.

6. The arrangement according to claim 3, characterized in that the at least one arm is able to be received in a groove provided in a face of at least one screen support of the screen supports.

7. The arrangement according to claim 1, characterized in that a slide mounted on the console is able to take-up forces applied on an arm of at least one screen support of the screen supports.

8. The arrangement according to claim 1, characterized in that each screen is articulated relative to the corresponding screen support along a vertical axis of rotation.

9. The arrangement according to claim 1, characterized in that at least one screen support of the screen supports comprises an outer flap and an inner flap articulated together along a vertical axis of rotation.

10. The arrangement according to claim 9, wherein the at least one screen support of the screen supports is associated with a corresponding structure, and wherein the outer flap is rotatably mounted about the vertical axis relative to the corresponding structure.

11. The arrangement according to claim 9, characterized in that one end of the inner flap is mounted to freely rotate and translate relative to a rail fixed on the console.

12. The arrangement according to claim 9, characterized in that, when the at least one screen support of the screen supports is in the deployed operating position, the outer flap and the inner flap are substantially located in the same plane in the extension of one another.

13. The arrangement according to claim 9, wherein both screen supports comprise the outer flap and the inner flap, wherein, when the screen supports are in the deployed operating position, the outer flaps of the two adjacent screen supports are located substantially edge-to-edge so as to form a partition wall between the two seats.

14. The arrangement according to claim 9, characterized in that the screen mounted on the at least one screen support of the screen supports is mounted to freely rotate on one of the flaps.

15. The arrangement according to claim 9, characterized in that, when the at least one screen support of the screen supports is in the stowed position, the outer flap and the inner flap are at least partially superposed on one another.

* * * * *